(12) United States Patent
Higgins

(10) Patent No.: US 7,645,092 B2
(45) Date of Patent: Jan. 12, 2010

(54) TREATMENT OF IN GROUND CHROMIUM ORE PROCESSING RESIDUE

(75) Inventor: Thomas E. Higgins, Reston, VA (US)

(73) Assignee: CH2M Hill, Inc., Englewood, CO (US)

( * ) Notice: Subject to any disclaimer, the term of this patent is extended or adjusted under 35 U.S.C. 154(b) by 427 days.

(21) Appl. No.: 11/756,387

(22) Filed: May 31, 2007

(65) Prior Publication Data

US 2007/0225542 A1 Sep. 27, 2007

Related U.S. Application Data

(63) Continuation-in-part of application No. 11/278,009, filed on Mar. 30, 2006.

(60) Provisional application No. 60/732,511, filed on Nov. 2, 2005.

(51) Int. Cl.
B09C 1/00 (2006.01)
(52) U.S. Cl. .................. 405/128.75; 588/319; 588/412
(58) Field of Classification Search .............. 405/128.1, 405/128.5, 128.75; 588/319, 412
See application file for complete search history.

(56) References Cited

U.S. PATENT DOCUMENTS

| | | | |
|---|---|---|---|
| 4,705,639 A | 11/1987 | Aldrich | |
| 5,000,859 A | 3/1991 | Suciu et al. | |
| 5,155,042 A | 10/1992 | Lupton et al. | |
| 5,202,033 A | 4/1993 | Stanforth et al. | |
| 5,285,000 A | 2/1994 | Schwitzgebel | |
| 5,304,710 A | 4/1994 | Kigel et al. | |
| 5,397,478 A * | 3/1995 | Pal et al. ................ | 405/128.75 |
| 6,464,864 B2 | 10/2002 | Sivavec | |
| 6,607,474 B2 * | 8/2003 | Chowdhury ............. | 405/128.5 |
| 6,884,352 B1 | 4/2005 | Kennedy | |
| 2004/0208705 A1 | 10/2004 | Yen | |

OTHER PUBLICATIONS

U.S.P.T.O. Final Office Action mailed Sep. 10, 2007 in U.S. Appl. No. 11/361,325.
Earth Science Services, "Biogeochemical Reductive Dechlorination," Dec. 2003.
Higgins, Thomas E., et al., "Treatment of Plating Wastewaters by Ferrous Reduction, Sulfide Precipitation, Coagulation and Upflow Filtration," Proceedings of the 36th Industrial Waste Conference, Ann Arbor Science—The Butterworth Group, May 12-14, 1981, pp. 462-471.
USPTO Final Office Action mailed Sep. 10, 2007 in U.S. Appl. No. 11/361,325.
The International Search Report and the Written Opinion of the International Searching Authority, mailed Nov. 16, 2007 in International Application No. PCT/US06/60425.
U.S. Appl. No. 11/361,325, filed Feb. 24, 2006—189442/US/2.
Notice of Abandonment dated Mar. 28, 2008, U.S. Appl. No. 11/361,325, 2 pages.
Final Office Action dated Sep. 10, 2007, U.S. Appl. No. 11/361,325, 9 pages.
Amendment dated Jun. 12, 2007, U.S. Appl. No. 11/361,325, 14 pages.
Office Action dated Mar. 20, 2007, U.S. Appl. No. 11/361,325, 11 pages.
U.S. Appl. No. 11/278,009, filed Mar. 30, 2006—189442/US/3.
Non-final Office Action dated Aug. 12, 2009, U.S. Appl. No. 11/278,009, 8 pages.
Preliminary Amendment dated Dec. 11, 2007, U.S. Appl. No. 11/278,009, 6 pages.
Preliminary Amendment dated Jun. 12, 2007, U.S. Appl. No. 11/278,009, 9 pages.

* cited by examiner

Primary Examiner—John Kreck
(74) Attorney, Agent, or Firm—Dorsey & Whitney LLP

(57) ABSTRACT

In methods for treatment of in ground chromium ore processing residue contamination, ferrous sulfide is provided as a substantially insoluble material in the residue deposit. The ferrous sulfide accordingly may remain substantially in place, in the pores of the soil or residue, even over long periods of time, regardless of underground water movement or diffusion. As a result, the ferrous sulfide may act continuously to chemically reduce and remove contamination. As hexavalent chromium diffuses from the soil or residue, it is reduced by the ferrous sulfide. The ferrous sulfide may be placed into the underground deposit by injecting a ferrous salt solution into the deposit, waiting for a precipitation to elapse, and then injecting a sulfide solution into the deposit.

7 Claims, No Drawings

TREATMENT OF IN GROUND CHROMIUM ORE PROCESSING RESIDUE

PRIORITY CLAIM

This application is a Continuation-in-Part of U.S. patent application Ser. No. 11/278,009 filed Mar. 30, 2006 and now pending, which application claims priority to U.S. Provisional Patent Application No. 60/732,511 filed Nov. 2, 2005. These applications are incorporated herein by reference.

BACKGROUND

For much of the twentieth century, chromite ore was processed at various locations in the United States, to manufacture chromium and related materials. Processing the chromite ore created large amounts of chromite ore processing residue (COPR). Millions of tons of COPR were then placed into the ground, often at or near the processing locations. These sites, which are now contaminated with COPR, are in or near densely populated urban and waterfront areas in United States. There are similarly contaminated sites in Europe, Japan, and other countries.

COPR is similar in texture to coarse gravel. It is formed as solid nodules or pellets generally ¼ to ½ inch in diameter, as a waste product from ore processing. These pellets were often used like gravel, as grading and fill material, and also in construction of residential, commercial and industrial buildings. COPR was also used in roadbeds and pipeline trenches. Consequently, some COPR deposits may extend for thousands of feet under dense urban development. In addition, in many of these locations, the COPR is below the ground water table. In some locations, the COPR is mixed with other materials, such as soil, sand, etc.

COPR is a strong alkaline or caustic material. It typically has a pH of about 11-12. COPR typically also contains %1-%30 of hexavalent chromium, having the chemical symbol Cr(VI). Cr(VI) is toxic to humans. It can be absorbed into the body via the skin, mouth or via inhalation. It is known to cause cancer and genetic mutations. Consequently, COPR presents serious environmental and public health hazards.

Cr(VI) is also present in other types of contaminated sites, dissolved in ground water. The Cr(VI) may be the result of releases from metals plating operations, from the application of Cr(IV) corrosion inhibitors, and from landfills or other disposal sites.

At COPR contaminated sites, the chromium is present in the solid particles as well as in the ground water in the pores or spaces between the COPR particles or pellets. Since Cr(VI) is soluble in water, if the pore water is removed, the hexavalent chromium is replaced by a slow diffusion or leaching of additional hexavalent chromium from within the particles. As a result, pump and treat or soil washing is ineffective or at least impractical for treatment of COPR sites.

Cr(VI) in pore water can be converted to trivalent chromium, which has the chemical symbol Cr(III), using remediating chemical compounds. These compounds include soluble ferrous iron salts, such as ferrous sulfate or ferrous chloride, or other similar remediating compounds. Cr(III) is insoluble and relatively non-toxic. Accordingly, if the Cr(VI) could be substantially completely converted to Cr(III), the COPR at many sites could then be safely left in the ground. However, with these chemical remediation methods, the soluble remediating compounds tend to be washed away by ground water movement relatively quickly. Consequently, the conversion process expectedly does not last long enough to clean up the site.

Other in-situ clean up processes use biological reduction of the Cr(VI), with or without use of other remediating materials. In biological clean up techniques, organic materials containing bacteria and nutrients are mixed into the COPR contaminated soil. However, in general, these types of biological reduction techniques require a pH conducive for growth of bacteria, typically about 6.5 to 9.5. Consequently, biological techniques have required adding large amounts of acid into the contaminated site, to lower the pH to a level acceptable for growth of bacteria. The acid causes destruction of the COPR particle structure. This can make future handling of the COPR more difficult. The acid also generates large volumes of carbon dioxide gas. In addition, placing large amounts of acid into the ground can damage structures on or in the ground. The disadvantages of the need for this use of acids has largely prevented effective use of biological remediation techniques on COPR.

In view of these problems, plans for permanent clean up of COPR sites have largely contemplated excavation and removal of the COPR material. This can require demolition, in-fill, and reconstruction of buildings on the contaminated sites. Moreover, the excavated material must still be remediated off site to convert the Cr(IV) to Cr(III), before it can be placed in landfill or other final disposal site. The costs, disruption, and delays associated with excavation and removal of the contaminated material can of course be enormous. Treating sites having dissolved Cr(IV) presents similar problems. Accordingly, improved methods for cleaning up COPR and dissolved Cr(IV) contaminated sites are needed.

SUMMARY OF THE INVENTION

In a first aspect, in a method for treatment of dissolved chromium or COPR, ferrous sulfide is provided as a substantially insoluble reducing compound material in the pores of the COPR or soil. The ferrous sulfide accordingly substantially remains in place and is not washed out by water movement or diffusion. Accordingly, the ferrous sulfide is available when hexavalent chromium diffuses from the COPR. Ferrous sulfide may advantageously initially be applied as solutions of ferrous and sulfide salts, which can be injected separately into the COPR deposit, and then combine to form a solid. In liquid form, the reducing salts are easier to apply into the ground. The distribution throughout the pores may also better in comparison to applying a reducing compound in a solid form.

In one aspect, a ferrous salt solution is injected or pumped into an underground COPR deposit, displacing the ground water from the pores in the COPR deposit. The ferrous salt solution is acidic. Consequently, the ferrous salt remains in solution. Over time, e.g., 1-5 days, the acidic ferrous salt solution tends to be neutralized by the alkaline COPR deposit. The pH of the solution rises causing the ferrous salt to precipitate out within the pores of the COPR deposit. A sulfide solution may then be separately injected into the COPR deposit to form ferrous sulfide. The ferrous sulfide remains substantially remains in the COPR deposit, reducing Cr(IV) leaching out of the COPR particles to Cr(III). The level of Cr(IV) is reduced to an environmentally acceptable low level.

Other objects, features and advantages will become apparent from the following description. The invention resides as well in sub-combinations of the steps and elements described.

The steps and elements essential to the invention are described in the claims, other steps and elements being not necessarily essential.

DETAILED DESCRIPTION

In general, for treatment of COPR, the reducing compound should be effective at reducing hexavalent chromium at a pH of about 8-13, and typically about 10, 11, 12, or 13, so that the alkalinity of the COPR does not need to be neutralized. This avoids the need to add large amounts of acid to lower the pH. The reducing compound advantageously generally does not excessively promote the formation of minerals that can result in the swelling of the COPR. The reducing compound is also preferably capable of remaining in the pores for at least 6, 9 or 12 months, or longer, without loss of effectiveness, even with movement of groundwater. At some sites, it may be necessary or advantages to have the reducing compound remain in place for several years.

In one embodiment, a ferrous salt solution and a sulfide salt solution (such as ferrous sulfate and sodium sulfide provided as liquid precursors) are dispersed into the COPR contaminated zone. The ferrous ions combine with the sulfide ions to form a colloidal precipitate of ferrous sulfide. Since the ferrous sulfide particles form in the injection system piping or in the soil, they are small (colloidal) and hence easy to mix completely with COPR and surrounding soil pores. The ferrous sulfide may be completely solidified while still in the injection system, so that already solid ferrous sulfide particles are placed in the ground. Ferrous sulfide particles may alternatively be delivered in bulk to the site, in solid or slurry form. Particles with a size of less than about 5, 4, 3, 2 and more often 1 micron (mean diameter) are generally more effectively injected in an aqueous liquid, in comparison to larger size particles. The FeS particles are consequently formed with an intended particle size of 1 micron or less.

The ferrous sulfide reacts with hexavalent chromium in solution converting the chromium to the trivalent form, which precipitates as a hydroxide. The ferrous iron is oxidized and forms ferric hydroxide precipitate. The sulfide is oxidized to elemental sulfur. The low solubility of ferrous sulfide helps to prevent it from being washed out of the system by groundwater movements. Ferrous sulfate may be used with or instead of ferrous chloride.

The result of these reactions is the in situ lowering of the hexavalent chromium in the water surrounding the COPR. Additional hexavalent chromium will dissolve and diffuse from inside the COPR particles to the particle surfaces, where it will react with the solid ferrous sulfide particles. In addition, the ferrous sulfide solids will partially dissolve releasing molecules of ferrous sulfide which penetrate the COPR particles and react with dissolved Cr(VI) in the COPR. Due to the low solubility of ferrous sulfide only a small portion of the ferrous sulfide is dissolved as needed for the Cr(VI) reaction. Hence the solid will remain for a long time, unless needed for reduction of the Cr(VI). Sufficient ferrous sulfide particles are provided to treat the hexavalent chromium over a period of months or years to a desired remediation standard.

The ferrous sulfide may be generated by the mixing of a ferrous salt solution with a solution of sodium sulfide (above ground or in injection system piping) by the following reaction:

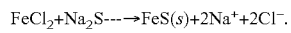
$FeCl_2 + Na_2S \rightarrow FeS(s) + 2Na^+ + 2Cl^-$.

The resulting precipitate of ferrous sulfide tends to form rapidly. Consequently, the ferrous sulfide may solidify completely into particles, before it is placed in the ground. The ferrous sulfide generally will first form a neutral molecule of ferrous sulfide, followed by growth to colloidal and larger particles of ferrous sulfide. This makes it easier to inject and distribute throughout the COPR if the ferrous sulfide is freshly precipitated when compared to a solid that has to be reduced in size and injected as a slurry. Additives such as surfactants, detergents, and phosphates may be used. Precipitation slowing additives may also be used to slow down formation of solid ferrous sulfide.

The FeS is advantageously formed as a solid either in the pores of the COPR or in the pore space between individual COPR particles, or in the equipment used to mix and inject the chemicals into the COPR deposit. If formed on the outside of the pores, it is preferably pushed uniformly throughout the pores of the COPR or the subsurface. Excess ferrous sulfide is advantageously added to account for oxidation by air, insufficient mixing, or other losses.

Ferrous sulfide reacts with hexavalent chromium (represented as chromate) by the following reaction:

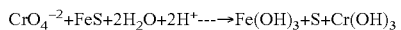
$CrO_4^{-2} + FeS + 2H_2O + 2H^+ \rightarrow Fe(OH)_3 + S + Cr(OH)_3$

Iron and chromium are converted to their trivalent form and precipitate as hydroxides. Sulfide is oxidized to elemental sulfur (not sulfate). This helps to avoid swelling, which appears to be associated with mixing sulfate salts with COPR.

For stoichiometric reaction, for each gram of hexavalent chromium (as Cr) need to add 1.08 grams of ferrous chloride (as Fe) plus 1.5 grams of sodium sulfide (as $Na_2S$). Therefore add 3 times stoichiometric of 3.24 g of ferrous chloride or ferrous sulfate (as Fe) plus 4.5 g of $Na_2S$ for each gram of hexavalent chromium. An FeS concentration greater than 3 times this stoichiometric dose may be needed to provide good results. Commercial solutions of ferrous sulfate and ferrous chloride may be used, as these contain acid in addition to the salt. These materials are the byproduct of acid pickling of steel. Accordingly, they are economically available in large quantities. To minimize corrosion to chemical delivery equipment, the excess acid may be neutralized with an alkaline compound such as sodium hydroxide before injection.

Although the concentrations of the reducing compounds may of course be varied for specific applications, the following guidelines may be used.

Ferrous Chloride: 9 to 14% solution (as Fe) liquid technical grade

Ferrous Sulfate: 5 to 7% solution (as Fe) liquid technical grade

Sodium Sulfide: 10 to 30% solution (make from dry chemical)

The measurement of acceptable remediation of Cr(IV) may vary depending on the characteristics, location, and regulation of each specific contaminated site. A reduction of Cr(IV) to concentrations of 240 to 20 mg/kg, or less, may be required, representing reduction of 95% to 99.5% or more of the initial concentration of Cr(VI) in the contaminated soil or COPR.

The ferrous sulfide may be injected or placed by pumping solutions of the two chemicals separately with precipitation occurring in the ground. When injected as a liquid, the reducing compound may be placed into the ground with a hydropunch or pipe, or with injection wells, or using direct push methods. In a typical application, a 1-4 inch diameter pipe is driven into position and then the liquid is pumped in or injected. Injection times at each punch or placement may vary, with 5-90 minutes being typical. The pipe is then moved over to the next designated position. This procedure can repeated, in a grid, spiral, or other pattern, until the entire site has been injected. Slant injection may also be used to place the liquid or slurry reducing compound under in or on ground structures, or to reach positions not easily directly accessible from vertically above. Hydraulic or pneumatic fracturing methods may also be used, optionally in combined fracturing/injection methods to deliver a slurry containing ferrous sulfide particles to the in ground deposit. Fracturing has the potential for improving delivery of the FeS into low permeability formations. Permeability of fractured formations may be dramatically increased, depending on the site conditions.

With injection methods for treatment of COPR, the FeS particles may be formed by mixing of the $FeCl_2$ and the $Na_2S$ solutions into the injection equipment. Separate metering pumps may be used for each component, with the solutions passing through an in line mixer before injection. Since the reaction between the $Fe^{2+}$ and the $S^{2-}$ is very rapid, small particles may be created. Deflocculating and/or sequestering agents, such as polyphosphate, non-ionic detergent, or silicone-based dispersing agents may be added to help keep the FeS particles dispersed as they are delivered into the underground matrix. Since the FeS is practically insoluble in water, emulsified vegetable oil may be used as a transport medium to disperse the FeS through the COPR. Caustics may be added to neutralize the excess acids of the ferrous salt before injection.

While it may not be necessary in most applications, the reducing compound may also be placed in permanent, or semi-permanent wells or well pipes. While most COPR deposits are below the water table, the present methods may also be used in COPR deposits above the water table. Similarly, these methods may be used to clean up Cr(VI) contamination other than from COPR sites, above or below the water table. In the case of COPR, since the reducing compound will generally be mixed with a solution containing water before or as it is placed into the COPR deposits, the pores between the pellets will become filled with the ferrous sulfide containing liquid even above the water table. Regardless of the type of contamination to be treated, the ferrous salt, or the sulfide salt, or both, may also be added to the soil as dry salts. Water in the ground (natural groundwater or water pumped into the ground) may then mix with the salt(s) in the ground. The salt(s) dissolve in the water, mix together and chemically react to form solid ferrous sulfide.

In augering applications, conventional or hollow stem augers may be used. With augering, the reducing compound may be a solid, a liquid or a slurry. Alternatively, components can be mixed in-line before injection or mixed and injected using an auger soil mixer. Other methods of mechanically mixing the soil with ferrous sulfide or ferrous sulfide precursors may be used, including plowing, rototilling, and soil excavation followed by above ground mixing and then mixed soil replacement.

Testing was conducted on chromite ore processing residue (COPR). Several columns were prepared to evaluate COPR chromium reduction with various concentrations of sulfide along with either ferrous chloride or ferrous sulfate. The columns were prepared in the following manner:

1. Column material consists of 6-inch clear PVC pipe with white PVC end caps.

2. The bottom end cap included a ½ inch plastic valve for sampling the liquid phase of the column, and was sealed using PVC glue.

3. The top end cap included two ¼ inch barbed fittings for filling and venting during set up and sampling, and was sealed with an inert silicone based vacuum grease, allowing the top to be removed for solids sampling.

4. Approximately 1-inch of geotextile material and approximately 4-inches of 0.2-mm quartz sand were added to the base of the column to support the COPR material, and allow water to drain freely.

5. Deionized water was added to the columns to determine the pore volume contained in the geotextile material and sand. This volume was determined to be 900-ml. Two of these pore volumes will be removed from the column before liquid samples are taken, which will represent the liquid portion surrounding the COPR.

6. The COPR material was screened using a 0.5-inch sieve.

7. The stoichiometric amount of sodium sulfide was determined from the Cr-VI concentration in the COPR. The sodium sulfide solid material was weighed on an analytical balance and dissolved in 1-liter of deionized water.

8. The amount of iron product was determined based on the sulfide and Cr-VI concentrations. Analytical grade ferrous chloride (powder hydrated with deionized water) was used for column 1 (C1), and technical grade ferrous chloride and ferrous sulfate liquid material was used for the other columns.

9. The appropriate amount of screened COPR was placed in a 2-gallon disposable plastic bucket and placed in a laboratory fume hood.

10. 1-liter of site groundwater was added to the COPR first, to create a slurry.

11. ⅓ of the sulfide was added, mixed well, and then followed with ⅓ of the ferrous iron and additional mixing. This process was continued until all the treatment chemicals were added.

12. The COPR with treatment chemicals was then added to the test columns.

13. The top end cap was sealed with vacuum grease and placed on the column. Groundwater was added to fill the column and eliminate headspace.

14. Table 1 summarizes the conditions used for each of the column tests.

15. Sampling was started by allowing 1,800-ml to flow from the column first. This represents two times the void volume contained in the geotextile material and sand at the base of the column. After this portion is removed, samples that represent the liquid contained in the COPR material is collected for testing.

16. After the water samples are collected the top caps are removed for solids sampling. A core device is used to collect a top-to-bottom column of COPR material for testing.

17. After sampling the top cap was replaced, and the initial pore water was returned to the column, along with additional groundwater to eliminate headspace.

18. Analytical data for samples taken during the first 72 days following chemical addition are presented in tables 2 and 3. Table 2 shows the pore water hexavalent chromium concentrations. Table 3 shows the hexavalent chromium in the solid COPR.

19. All doses of ferrous iron and sulfide reduced the pore water concentration of hexavalent chromium in the pore water and in the COPR solids within a 2 month period.

TABLE 1

Column Dose Calculations

| | | Dose for Each Column | | | | |
|---|---|---|---|---|---|---|
| Parameter | Units | C1 | C2 | C3 | C4 | C5 |
| COPR amount | Kg | 5.0 | 5.0 | 4.0 | 4.0 | 4.0 |
| COPR Cr-VI | g/Kg | 3.41 | 3.41 | 3.41 | 3.41 | 3.41 |
| COPR Cr-VI | g | 17.05 | 17.05 | 13.64 | 13.64 | 13.64 |
| COPR Cr-VI | moles | 0.33 | 0.33 | 0.26 | 0.26 | 0.26 |
| $Na_2S * 9H_2O$ (~100%) | g | 472 | | | | |
| Sulfide, as S | g | 63 | | | | |
| Sulfide, as S | moles | 1.97 | | | | |
| $Na_2S$ (60%) | g | | 182 | 146 | 152 | 101 |
| Sulfide, as S | g | | 44.8 | 35.9 | 37.4 | 24.9 |
| Sulfide, as S | moles | | 1.4 | 1.12 | 1.16 | 0.77 |
| $FeCl_2 * 4H_2O$ (reagent) | g | 389 | | | | |
| $Fe^{2+}$ | g | 109 | | | | |
| $Fe^{2+}$ | moles | 1.96 | | | | |
| Ferrous Chloride (Kemiron) 10.46% $Fe^{2+}$ | g | | 2,107 | | 530 | 350 |
| $Fe^{2+}$ | g | | 220 | | 55 | 37 |
| $Fe^{2+}$ | moles | | 3.95 | | 0.99 | 0.66 |
| Ferrous Sulfate (Kemiron) 5.20% $Fe^{2+}$ | g | | | 3,379 | | |
| $Fe^{2+}$ | g | | | 176 | | |
| $Fe^{2+}$ | moles | | | 3.15 | | |
| Sulfide:Cr-VI ratio as S:Cr | mole/mole | 6.0 | 4.2 | 4.3 | 4.5 | 3.0 |
| Iron:Cr-VI ratio as $Fe^{2+}$:Cr | mole/mole | 6.0 | 12.0 | 12.0 | 3.8 | 2.5 |

TABLE 2

COPR FeS Column Test Results—Water

| Reaction Time | Cr-VI (ug/L) | | | | |
|---|---|---|---|---|---|
| (days) | C1 | C2 | C3 | C4 | C5 |
| 0 | 2,650 | 2,650 | 2,650 | 2,650 | 2,650 |
| 5 | — | <1 | <1 | — | — |
| 14 | <1 | — | — | 8.44 | 9.02 |
| 42 | — | — | — | — | — |
| 46 | — | — | — | ND | ND |
| 68 | — | ND | ~7 | — | — |
| 77 | ~7 | — | — | — | — |

TABLE 3

COPR FeS Column Test Results—Solids

| Reaction Time | Cr-VI (mg/Kg) | | | | |
|---|---|---|---|---|---|
| (days) | C1 | C2 | C3 | C4 | C5 |
| 0 | 3,410 | 3,410 | 3,410 | 3,410 | 3,410 |
| 12 | — | <0.010 | <0.019 | — | — |
| 14 | — | — | — | 0.30 | <0.11 |
| 21 | 0.13 | — | — | — | — |
| 42 | — | — | — | — | — |
| 46 | — | — | — | 0.11 | 0.42 |
| 68 | — | <0.053 | <0.065 | — | — |
| 77 | 0.42 | — | — | — | — |

While iron sulfide (FeS) can be formed using ferrous chloride ($FeCl_2$) and sodium sulfide ($Na_2S$) solutions and mechanically mixed with COPR deposits, this process requires direct access to the ground surface and a significant disturbance of the site. It therefore may be not well adapted for use on some developed sites, unless the structures on the developed site are first demolished and removed. Injection of the solutions avoids these disadvantages of mechanical mixing. However, getting the injected liquids to the desired location in the COPR deposit before they precipitate as iron sulfide can be problematic, since the resulting solid can plug up the pores in the solids preventing flow and depleting the chemicals before they reach the COPR deposit.

COPR deposits have a high concentration of alkaline materials. Water in the pores between COPR particles will typically have a pH of about 11-12. Ordinarily, ferrous iron has low solubility in COPR deposits, due to precipitation of ferrous hydroxide at high pH conditions. Ferrous iron combines with hydroxide according to the following reaction:

$$Fe^{+2} + 2OH^- \rightarrow Fe(OH)_2 (solid)$$

At equilibrium, the following solubility equation applies:

$$[Fe^{+2}] \times [OH^-]^2 = 10^{-14.39}$$

Where $[Fe^{+2}]$ denotes the molar concentration of ferrous iron.

At pH 12

$$[OH^-] = 10^{-2} \text{ moles/L}$$

$$[Fe^{+2}] = 10^{-14.39}/(10^{-2})^2 = 10^{-10.31}$$

1 mole/L of $[Fe^{+2}] = 55.85$ g/l, $Fe^{+2} = 0.0000027$ mg/L at pH 12

At pH 7 $[OH^-] = 10^{-7}$ $$[Fe^{+2}] = (10^{-0.39})(55.85) = 27.34 \text{ g/l or } 3\%$$

At pH 6

$$[Fe^{+2}]_{solubility} = 30\%$$

Ferrous sulfate and ferrous chloride are produced by contacting sulfuric or hydrochloric acid with ferrous iron deposits or steel. The technical commercial chemical generated as a by product from steel production has up to 5% excess acid (typically sulfuric acid in ferrous sulfate and hydrochloric acid in ferrous chloride) mixed with ferrous salt. It has now been discovered that when ferrous chloride or ferrous sulfate (commercial or technical grade) solutions are mixed with COPR in concentrations used for Cr (VI) reduction, the pore water pH is depressed to about 6-7. It then remains depressed typically for a few days. Then the pH rises back to a pH of about 9-12.

In an alternative method for treating COPR deposits or formations, ferrous chloride or ferrous sulfate solutions are injected into the COPR deposits. The acid in the solution keeps the solution in the pH range (e.g., 6-7) where ferrous iron is soluble. The ferrous chloride or ferrous sulfate solution may be injected in a volume of water sufficient to fill the pore volume in the target COPR deposit, so that the ferrous will be distributed throughout the deposit. After this injection of ferrous, the alkaline material in the COPR neutralizes the acid in the ferrous solution. As the pH rises, the ferrous in the ferrous solution precipitates' out as solid ferrous hydroxide. This precipitation time interval typically takes 1, 2, 3, 4, 5, or 6 days. Under certain conditions, it may take even longer. The pH in the COPR deposit may be monitored via sampling or underground probing to determine when the precipitation time interval has elapsed. Alternately, samples of the COPR can be mixed with ferrous solution and pH monitored to determine time for the pH to reach a point where ferrous hydroxide is sufficiently insoluble. Alternatively, the precipitation time interval can simply be set at an interval sufficiently long (e.g., more than 7 days) to insure that the pH in the COPR deposit has returned to its original range, and that the ferrous has precipitated out.

After the precipitation time interval has passed, a sodium sulfide solution is injected into the COPR deposit. The sodium sulfide solution is also provided in a volume sufficient to fill the pores in the deposit (i.e., the open spaces between the COPR particles). Since the ferrous hydroxide is at this time precipitated out as solid, it is not significantly displaced by the sodium sulfide solution. Rather, the ferrous hydroxide generally remains in place within the deposit. Since ferrous sulfide is much less soluble than is ferrous hydroxide, the ferrous iron tends to go into solution and then re-precipitate out as ferrous sulfide. The ferrous sulfide then reduces the Cr (VI) as described above.

$$Fe(OH)_{2(solid)} + 2Na^+ + S^= \rightarrow FeS_{(solid)} + 2Na_4^{+2}OH^-$$

At pH 12, as shown before, $Fe^{+2} = 0.0000027$ mg/L
The solubility of $FeS_{(solid)}$ is governed by $$Fe^{+2} + S^= \rightarrow FeS_{(solid)}$$

$$[Fe^{+2}] \times [S^=] = 10^{-18.1}$$

The resulting ferrous concentration at equilibrium with 1 mg/L of $S^=$ At this concentration the molar concentration of sulfide is:

$$[S^=] = 10^{-4.5}$$

$$[Fe^{=2}] = 10^{-13.6} \text{ Molar}$$

Fe+2=0.0000000014 mg/L with 1 mg/L of $S^=$ present

Fe+2=0.0000027 mg/L in equilibrium with hydroxide.

Hence, even at pH 12, $Fe(OH)_2$ will dissolve and precipitate FeS.

In addition, since the COPR inherently has a high pH, when treating a mixture of COPR and other fill material (which typically has a lower pH), the ferrous iron will tend to precipitate as $Fe(OH)_2$ preferentially where the COPR is located, i.e., in the high pH regions of the fill material. Consequently, the COPR is essentially specifically and automatically targeted by the resulting FeS precipitate.

Where the COPR deposit is below the water table, the spaces or pores between the gravel-like COPR particles are filled with ground water. In the pumping or injection process described above, the ferrous liquid displaces the ground water from the pores. The sulfide solution then later displaces the ferrous liquid (after the ferrous iron precipitates out due to the rising pH). The injection process may be performed by installing temporary wells into the COPR deposit, and pumping the chemical solutions (acidic ferrous solution followed by sulfide solution) into the deposit via the wells. The chemical solutions may also be pumped into one or more wells, while ground water is pumped out of one or more other wells, to aid in the displacement of the ground water and distribution of the chemical solutions.

Depending on the size and characteristics of the COPR deposit to be treated, each of the chemical solution may be pumped in for a time interval ranging from minutes to days. The treatment zone within the deposit will typically extend from about 5 or 10 feet, up to about 100 feet, from the well hole. To achieve adequate distribution of the chemical solutions throughout the deposit, multiple well holes located in various patterns may be used. The well holes may optionally be removed or closed after injection of the chemical solutions. The chemical solutions may also optionally be injected via direct push methods, i.e., by simply driving a pipe into the COPR deposit, and pumping the chemical solutions through the pipe and into the COPR deposit (while also optionally raising the pipe through the deposit). Following injection of the chemical solutions, reduction of Cr(IV) may go on for several months to several years.

As used here, the singular includes the plural and vice versa, unless specifically excluded by the context. The word "or" as used here means either one, or any one, both, or all of the listed items, and does not mean an alternative qualitatively different element, or a non-equivalent element. The elements or steps described relative to one embodiment apply as well to other embodiments, except when otherwise specified.

Thus, novel methods and systems have been described. Various changes and modifications may of course be made without departing from the spirit and scope of the invention. The invention, therefore, should not be limited, except to the following claims and their equivalents.

The invention claimed is:

1. A method for reducing chromium (VI) in an underground deposit of chromium ore processing residue, comprising:
    injecting a ferrous liquid into the underground deposit of chromium ore processing residue, with the underground deposit comprising solid residue particles, and with pore spaces between particles, with the ferrous liquid reducing the pH of the pore water to less than about 7, and with the volume of ferrous liquid injected sufficient to substantially fill the pore spaces between the particles;
    waiting until the pH of the injected ferrous liquid increases to a pH of about 9; and then
    injecting a sulfide solution into the underground deposit.

2. The method of claim 1 with the ferrous liquid comprising ferrous chloride or ferrous sulfate, and with ferrous in the liquid precipitating out as ferrous hydroxide with the increase in the pH, and with the ferrous hydroxide then dissolving into the sulfide solution and re-precipitating out as ferrous sulfide.

3. The method of claim 1 further comprising measuring the pH the liquid in the deposit.

4. The method of claim 1 further comprising measuring pH of COPR samples treated with the ferrous treatment chemicals and determining time taken to achieve a desired pH.

5. The method of claim 1 further comprising waiting a predetermined time interval.

6. The method of claim 1 wherein the ferrous liquid comprises ferrous chloride or ferrous sulfate and the sulfide solution comprises sodium sulfide.

7. The method of claim 1 with the ferrous liquid comprising ferrous chloride or ferrous sulfate including up to %5 excess acid.

* * * * *